L. SANDERS.
SPRING WHEEL.
APPLICATION FILED FEB. 10, 1912.

1,040,426.

Patented Oct. 8, 1912.

2 SHEETS—SHEET 1.

Witnesses
Chas. L. Grieshauer.
A. B. Norton.

Inventor
Louis Sanders,
By Watson E. Coleman
Attorney

L. SANDERS.
SPRING WHEEL.
APPLICATION FILED FEB. 10, 1912.

1,040,426.

Patented Oct. 8, 1912.

2 SHEETS—SHEET 2.

Inventor
Louis Sanders,

Witnesses
Chas. L. Grieshauer.
A. B. Norton.

By Watson E. Coleman
Attorney

UNITED STATES PATENT OFFICE.

LOUIS SANDERS, OF CRAVENS, LOUISIANA.

SPRING-WHEEL.

1,040,426.

Specification of Letters Patent.

Patented Oct. 8, 1912.

Application filed February 10, 1912. Serial No. 676,764.

*To all whom it may concern:*

Be it known that I, LOUIS SANDERS, a citizen of the United States, residing at Cravens, in the parish of Vernon and State of Louisiana, have invented certain new and useful Improvements in Spring-Wheels, of which the following is a specification, reference being had to the accompanying drawings.

This invention relates to improvements in spring wheels and has for its primary object to provide means for yieldingly mounting and supporting the vehicle axle in the hub of a wheel.

Another and more specific object of the invention resides in the provision of a plurality of series of coiled springs radially arranged between the inner wall of the hub and the axle, and means whereby the introduction and proper positioning of the coiled springs therebetween is facilitated.

Still another object of the invention is to provide a spring wheel which is simple and durable in construction and may be inexpensively manufactured, and whereby the usual pneumatic tread may be dispensed with without sacrificing the resiliency of the wheel.

With the above and other objects in view, the invention consists of the novel features of construction, combination and arrangement of parts hereinafter fully described and claimed, and illustrated in the accompanying drawings, in which—

Figure 1:
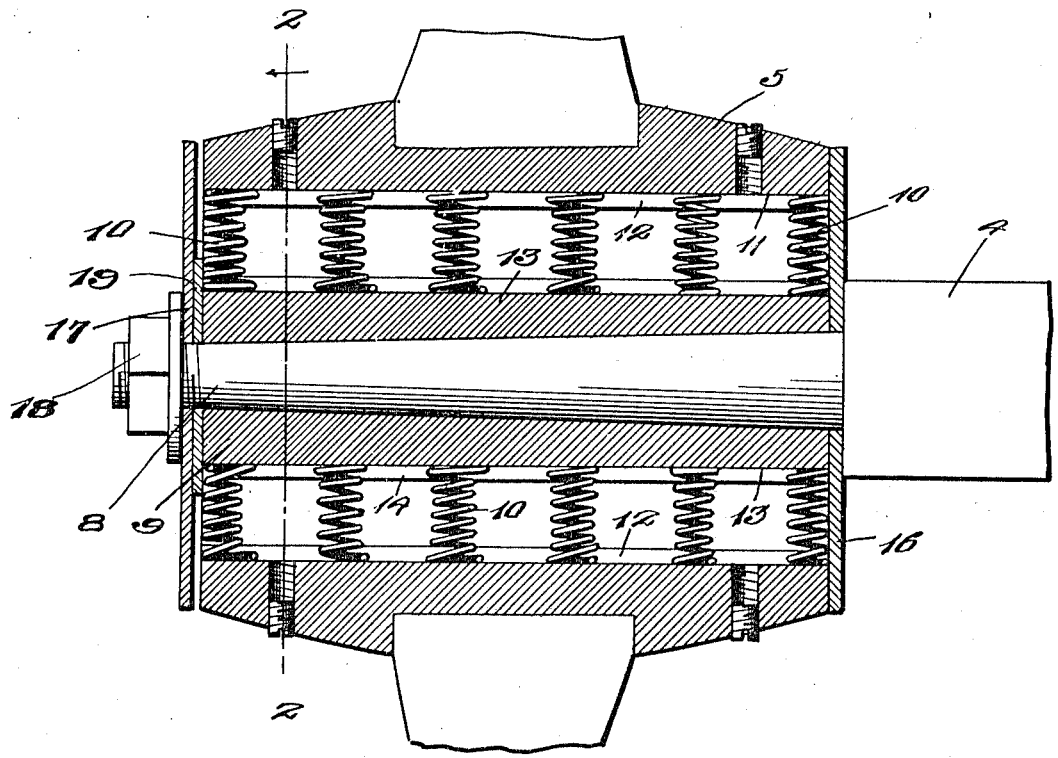
Figure 2:
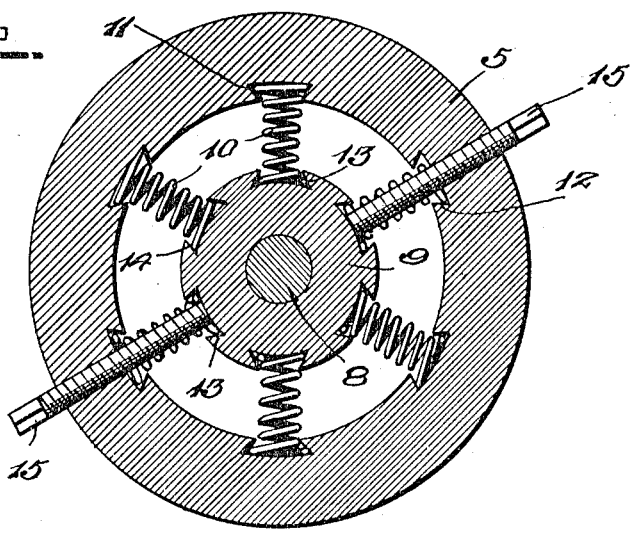
Figure 3:
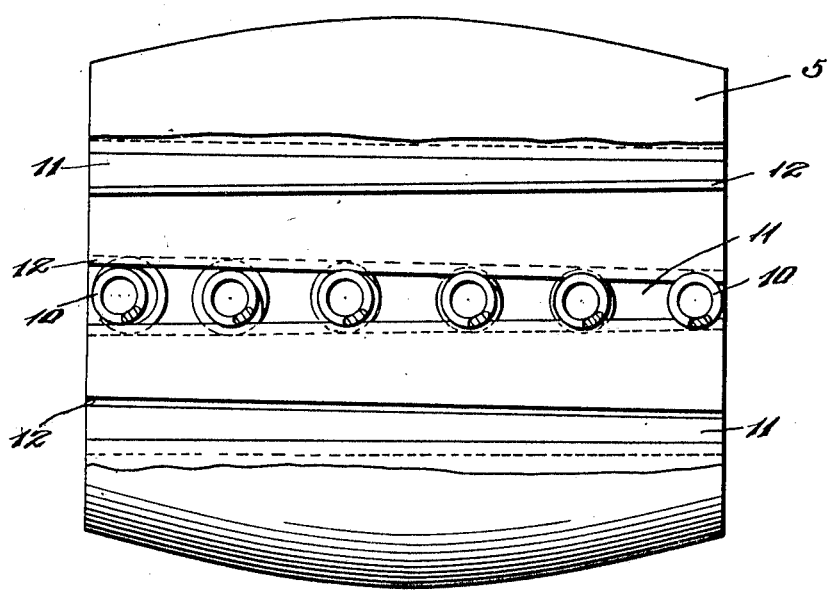
Figure 4:
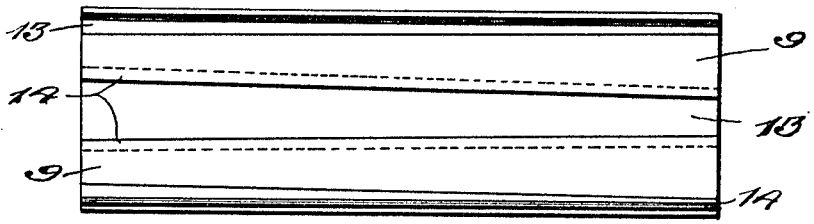

Figure 1 is a vertical longitudinal section through a wheel hub constructed in accordance with my invention showing the same mounted upon the vehicle axle; Fig. 2 is a section taken on the line 2—2 of Fig. 1 showing the holding bolts for the axle thimble mounted in the wheel hub; Fig. 3 is a fragmentary interior elevation of the wheel hub with the greater number of the cushioning springs removed; and Fig. 4 is an elevation of the axle thimble.

Referring in detail to the drawings 5 designates a vehicle hub to which the inner ends of the radiating wheel spokes are secured in the usual manner. The hub 5 is hollow or of annular form in cross section and is mounted upon the end of the vehicle axle 4. This axle is provided with the usual spindle 8 on which the sleeve or thimble 9 is loosely mounted. The hub 5 is normally held in spaced concentric relation to the axle thimble by means of a plurality of series of coiled springs 10.

The inner wall of the vehicle hub is provided with spaced longitudinal channels or grooves 11 which are open at the opposite ends of said hub. These channels or grooves are provided with the undercut or beveled side walls 12 and said channels gradually decrease in width or taper from their outer to their inner ends. The periphery of the thimble 9 is also provided with longitudinal grooves or channels 13 which correspond in number to the channels in the wall of the hub, said channels 13 tapering in a similar manner to the channels 11 from the outer to the inner ends of the thimble. The grooves or channels 13 in the thimble are also provided with the undercut side walls 14.

It will be observed from reference to Fig. 2 that the coiled springs 10 gradually increase in diameter from their intermediate portions to their ends, and the outer and inner end coils of the springs in the respective series also vary slightly in diameter, the end coils of the springs in the outer end portion of the hub being of greater diameter than those in the inner portion thereof. In arranging the springs within the hub, the springs of each series are inserted in proper order so that as the ends of the springs are forced into the inner and narrower ends of the grooves or channels 11 and 13 of the hub and axle thimble respectively, they will bind against the undercut walls of said channels and be securely held in their proper positions against either radial or longitudinal movement with respect to the hub and thimble. The wheel is of course, removed from the vehicle axle in order to arrange the springs within the same, and I have provided the screw bolts 15 which are threaded in the walls of the hub and are radially disposed to bind at their inner ends against opposite sides of the axle thimble. These holding bolts are arranged adjacent to the opposite ends of the hub and after the springs have been inserted are adapted to be removed, and the openings in the wall of the hub closed by means of suitable threaded plugs as will be readily understood. In this manner it will be seen that after the inner circular series of springs have been inserted into the inner ends of the grooves or channels in the hub and thimble, the opposed bolts 15 in the inner and outer ends of the hub are threaded inwardly to engage the thimble and rigidly hold the same in concentric relation to the hub.

After the parts have been assembled as above described, the wheel is ready to be fitted upon the axle. A circular disk or plate 16 is arranged at the inner end of the axle spindle and securely fastened to the body of the axle. This plate serves to close the inner end of the hub and prevent dirt and mud entering between the hub and the axle thimble and interfering with the proper action of the coiled springs. A similar plate 17 is also arranged upon the outer end of the axle spindle and closes the outer end of the hub. A nut 18 is threaded upon the end of the axle spindle and a washer plate 19 is also secured thereon with which the inner face of the plate 17 engages. The wheel hub is free to rotate between the plates 16 and 17 at the opposite ends thereof.

From the foregoing it is believed that the construction of my improved spring wheel and the manner of assembling the various parts will be readily understood.

It will be obvious that any desired number of series of the springs may be arranged between the hub and the axle thimble and that the strength of said springs will vary in accordance with the character of the vehicle and the load carried thereby to which the wheels are applied.

A wheel constructed in accordance with my invention is extremely durable and efficient in practical use and provides a maximum of resiliency whereby vibration of the vehicle body is greatly minimized. When the springs become broken, they may be easily and quickly removed and replaced by others, thus rendering it possible to keep the wheel in perfect repair at an insignificant expense.

While I have shown and described the preferred construction and arrangement of the various parts, it will be obvious that the invention is susceptible of considerable modification without departing from the essential features or sacrificing any of the advantages thereof.

Having thus described the invention what is claimed is:—

1. In a spring wheel, a hub, an axle thimble arranged within the hub and in spaced relation to the wall thereof, said thimble being provided with a plurality of longitudinally extending grooves gradually tapering from one end of the thimble, to the other, and a plurality of series of radially extending cushioning springs, the coils of each series of springs differing in diameter, one of the end coils of said springs being adapted for movement in the grooves of the thimble from the wider into the narrower ends of said grooves to bind against the side walls of the grooves, the other ends of said springs bearing against the inner wall of the wheel hub.

2. In a spring wheel, a hub, an axle thimble arranged within the hub and spaced from the wall thereof, said hub and thimble being provided in their opposed surfaces with a plurality of longitudinally extending grooves gradually tapering from one end to the other of the hub and thimble, and a plurality of series of radially extending cushioning springs having end coils of greater diameter than the intermediate coils and adapted to be fitted within the grooves of the hub and thimble respectively for binding engagement with the side walls thereof.

3. In a spring wheel, a hub, an axle thimble arranged within the hub in spaced relation thereto, said hub and thimble having a plurality of longitudinally opposed grooves, said grooves in the hub and thimble being correspondingly gradually reduced in width from the outer to the inner ends thereof and having undercut side walls, and a plurality of series of radially disposed cushioning springs having end coils of greater diameter than the intermediate coils and adapted to engage in the grooves of the hub and thimble and be moved into the same from the wider toward the narrower ends of said grooves and into binding engagement with the undercut side walls thereof.

In testimony whereof I hereunto affix my signature in the presence of two witnesses.

LOUIS SANDERS.

Witnesses:
   Thos. G. Washington,
   G. D. Moore.